United States Patent
Partridge, III

(10) Patent No.: US 6,493,321 B1
(45) Date of Patent: Dec. 10, 2002

(54) SYSTEMS AND METHODS FOR PROVIDING COMMUNICATIONS THROUGH AN ALTERNATE COMMUNICATION NETWORK

(75) Inventor: B. Waring Partridge, III, Far Hills, NJ (US)

(73) Assignee: AT&T Corp, Middletown, NJ (US)

( * ) Notice: Subject to any disclaimer, the term of this patent is extended or adjusted under 35 U.S.C. 154(b) by 0 days.

(21) Appl. No.: 08/767,364

(22) Filed: Dec. 16, 1996

(51) Int. Cl.[7] .................................................. H04J 3/14
(52) U.S. Cl. ..................................... 370/242; 379/88.18
(58) Field of Search ................................. 370/242, 244, 370/428, 522, 352, 354, 216; 379/88.18, 211, 89, 376, 396, 214, 218, 221, 142, 209, 132, 144

(56) References Cited

U.S. PATENT DOCUMENTS

| | | | |
|---|---|---|---|
| 5,414,754 A | | 5/1995 | Pugh et al. ..................... 379/67 |
| 5,463,677 A | * | 10/1995 | Bash et al. ..................... 379/88 |
| 5,627,875 A | * | 5/1997 | Kapsales ....................... 379/57 |
| 5,661,782 A | * | 8/1997 | Bartholomew et al. ....... 379/67 |
| 5,664,008 A | * | 9/1997 | Bossi et al. .................... 379/67 |
| 5,761,277 A | * | 6/1998 | Foladare et al. ............... 379/89 |

OTHER PUBLICATIONS

E. Nussbaum, "Voice Storage in the Network—Perspective and History," *The Bell System Technical Journal*, vol. 61, No. 5, May–Jun. 1982, pp. 811–819.

* cited by examiner

*Primary Examiner*—Chi H. Pham
*Assistant Examiner*—Kim T. Nguyen

(57) ABSTRACT

Systems and methods for providing communications path through a selected communications network in the event of a transmission failure on the initial, real-time, communications network are presented. The selected network operates in a non-real-time manner and is configured such that communications may be scheduled for transfer, rather than requiring instantaneous access. The use of the selected network reduces both the loading of and access costs to the real-time network. For example, a user who places an unanswered long-distance call may leave a message for the recipient, and that message is transferred to the recipient over the alternate network as time is available on the network, rather than over the primary long-distance voice network. The selected network may be a network that is entirely separate from the real-time network or, the "two" networks may be a single coextensive network having voice and data attributes.

24 Claims, 4 Drawing Sheets

SYSTEMS AND METHODS FOR PROVIDING COMMUNICATIONS THROUGH AN ALTERNATE COMMUNICATION NETWORK

BACKGROUND OF THE INVENTION

This invention relates to the transmission of communications over a communications network. More particularly, this invention relates to providing communication transmissions through an alternate network that is exclusive of the initial network, in the event of a failure during the transmission through the initial network.

Long-distance voice communications (i.e., communications between two different local exchange carriers—"LECS") are typically accomplished through an inter-exchange service provider ("IXP") that utilizes traditional analog transmission circuitry and signals. For example, assume a person in New York wishes to call someone in Texas. The New Yorker dials the Texas phone number on a phone serviced by NYNEX (i.e., the LEC in New York). NYNEX directs the call to the New Yorker's long-distance provider (e.g., AT&T) who utilizes conventional fiber-optic networks to connect the caller to the LEC in Texas (i.e., Southwestern Bell). The Texas LEC completes the call by directing the call from the long-distance provider (via an "access tandem") to the central office ("CO") that the Texas phone number is connected to.

The communication is completed in a normal fashion provided the person on the receiving end answers the phone. However, if the call goes unanswered, a failure occurs in the communication. A typical solution to the failed communication occurs when the called party subscribes to "call answer" service through his/her local LEC, in which case the call "goes through," but to the service instead of the called party. Another solution provides an alternate way for the caller to leave a message, for when the called party does not have an answering service. For example, the caller could leave a message on a local server of the long-distance provider, which would periodically attempt to call the recipient to deliver the message. This solution, however, requires multiple transmissions through the networks, which are relatively expensive and may often be heavily loaded.

It would therefore be desirable to provide a technique in which the caller of a failed long-distance call could provide a communication to the recipient without producing additional, expensive, communications through the traditional analog/fiber-optic transmission networks.

SUMMARY OF THE INVENTION

In accordance with the principles disclosed herein, systems and methods for improving communication transmissions are provided. Advantages of the disclosed system and method are obtained by utilizing an alternate network in which communications transmission may be made on a scheduled basis instead of real-time as is normally used for communications. This results in reduced loading on the real-time voice network, enhanced loading of the alternate network, and reduced access costs (i.e., from the LEC to the IXP networks).

A local server at the caller's location of the IXP detects the failed communication attempt and notifies the caller that the call did not go through. The caller is able to leave a message for the recipient—even if the recipient does not have an answering machine or subscribe to "call answering" from the local LEC—in a manner that increases the efficiency of the traditional voice network. The message, which is initially stored on the local server, is sent to a server of the IXP that is local to the recipient's location on a scheduled basis, rather than in real-time, through an alternate network. The alternate network may be a digital data network in which message packets and the like provide further improvements in efficiency; however, the alternate, separate, network may be formed from the same components as a traditional voice network. While it may be said that packet networks inherently forward packets in non-real time manner because a node may congested and packets may be delayed or re-routed, what is meant by stating that the message is forwarded in non-real time manner is that even the commencement of the sending of the message may be delayed. Moreover, it may be delayed a substantial amount of time, relative to the delay that normally occurs in packet networks. A two seconds, or even a few minutes, delay normally would not matter to a caller who was unable to reach a called party and chose to leave a message. The caller's insensitivity to delay allows the "luxury" of forwarding the message when the alternate network is not busy, or has spare capacity. To clearly distinguish between the two types of non-real time transmissions, the type contemplated herein is called "delay permissible non-real time" transmission.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
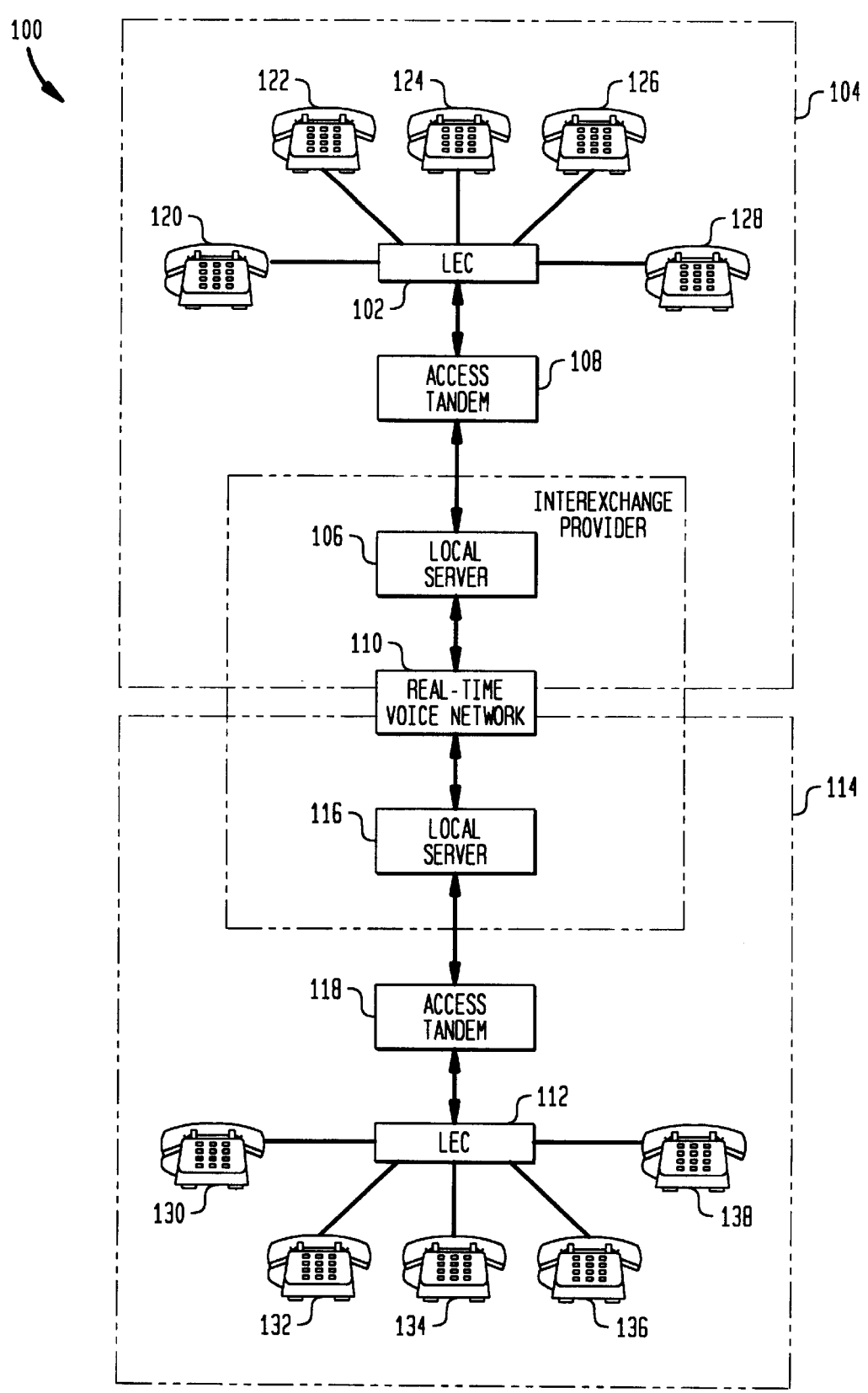
FIG. 1 is a block diagram of a traditional communication network that may be used to place long-distance telephone calls.

The present invention provides improved efficiency in real-time network communications by removing communications from the real-time network that do not require real-time access or, at least, can tolerate near-real-time communication. A conventional real-time communications system 100 is shown in FIG. 1. The basic components of the system 100 include a local exchange carrier ("LEC") 102 in a first region 104, a local server 106 of an inter-exchange provider ("IXP") located in region 104, an access tandem 108 that provides an interface between LEC 102 and server 106, a real-time network 110, a LEC 112 located in a second region 114, a local server 116 located in region 114 and an access tandem 118 for coupling server 116 to LEC 112. Real-time network 110 is shown to be partially located in both region 104 and region 114, as well as being located somewhere in between. This is to indicate that the network need only have an interface in each region to the local server and that the majority of the network may be located wherever is convenient.

LEC 102 provides local communication services to a number of local users 120–128 in region 104, while LEC 112 may provide substantially similar services to local users 130–138 in region 114. As long as the services required by the local users fall within the local region serviced by the corresponding LEC, the inter-exchange provider's services are not utilized. Thus, for example, when local user 122 in region 104 wishes to communicate with local user 134 in region 114, the selected inter-exchange provider completes the communication link between LECs 102 and 112.

The inter-region communication is made by LEC 102 directing local user 122's communication to a port in access tandem 108 designated for the selected inter-exchange provider. Local server 106 takes the communication from the port and directs it into real-time network 110 such that the communication is addressed to local user 134, who is connected to LEC 112. Real-time network 110 continues the process by contacting local server 116 which utilizes access tandem 118 as an entry point into LEC 112. LEC 112 then attempts to complete the connection to local user 134. Once local user 134 acknowledges the communication (i.e., answers the phone), bi-directional real-time communication takes place between local users 122 and 134.

Deficiencies in communication system 100 occur, however, when local user 134 does not acknowledge the attempted communication (i.e., a failed communication occurs because the called party does not answer), or when the network itself is blocked for some reason. Even though the actual connection is not established between telephones 122 and 134 until a user answers phone 134 by going "off-hook," network resources are nevertheless occupied to maintain the necessary signaling. In some situations, where the subscriber of telephone 134 has previously subscribed to "call answer" message leaving service with LEC 112, after a predetermined number of rings (the specific method used to determine how many rings and whether the called party's phone is "busy" or "unanswered" is LEC dependent) the call is transferred to a message platform selected by the called subscriber which is local to the called subscriber. The connection is "cut through" from telephone 122 through the network of LEC 102, through the IXP network, and through the network of LEC 112 so the user of telephone 122 can then leave a message for the local user of telephone 134.

Figure 2:
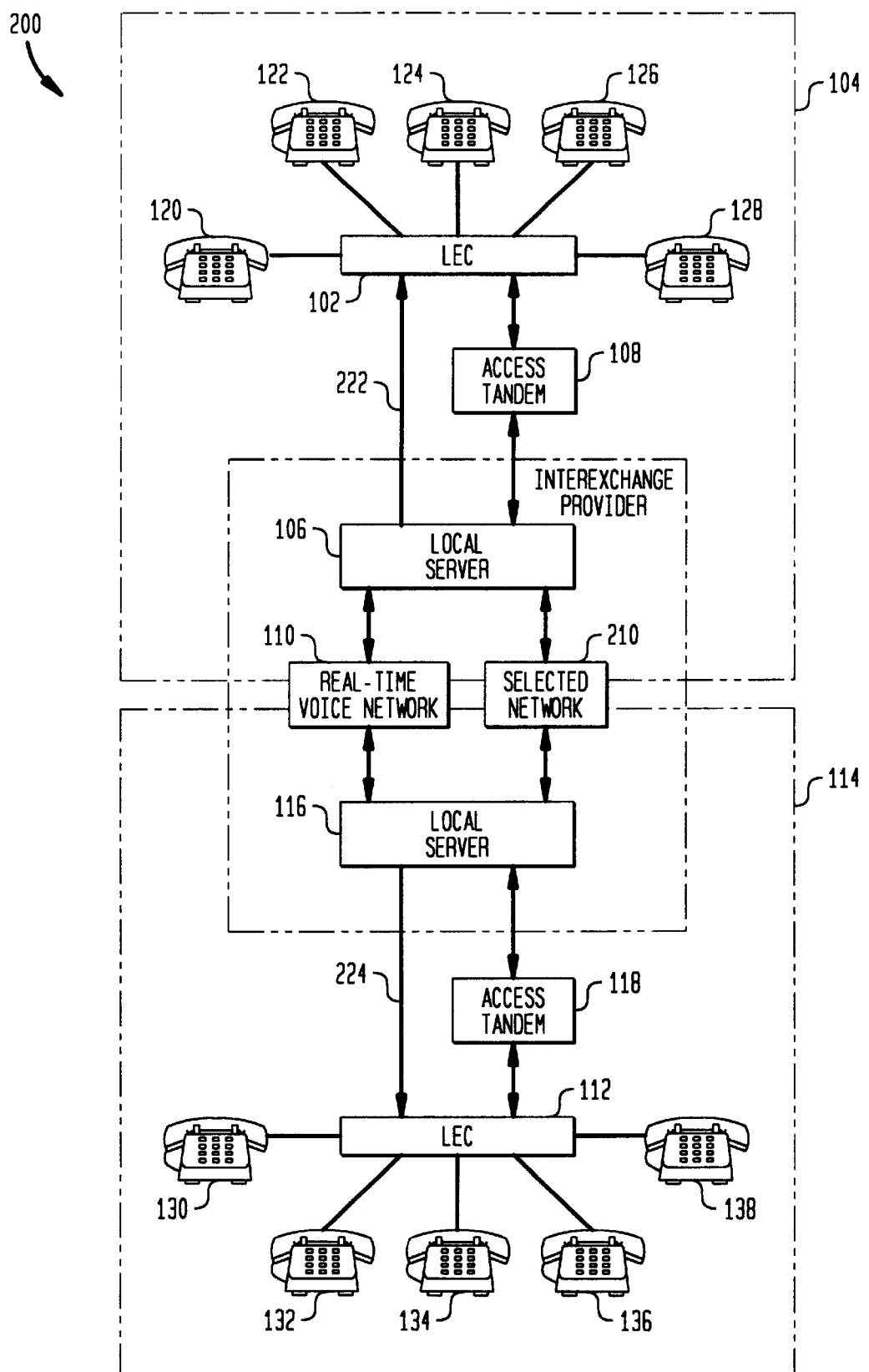
FIG. 2 is a block diagram of a communications system that includes two networks for transmitting information in accordance with the principles of the present invention.

The disadvantages of conventional communication system 100 are overcome by the present invention, one embodiment of which is shown in FIG. 2. Communication system 200 includes many of the same components as communication system 100 (and those components are numbered using the same numbering convention as in FIG. 1). Communication system 200 also includes alternate network 210 that provides a secondary path for communications (that do not require real-time access). As shown in FIG. 2, alternate network 210 provides a parallel path between two local servers located in two different regions. Network 210 may be a data network that utilizes known techniques for data transfer, such as data packet switching, to further increase the efficiency of communications. Alternatively, alternate network 210 may be a separate analog/fiber optic network similar to network 110, so that an essentially independent secondary communications path is provided.

Alternate network 210 can have many uses, and one of those uses may be an enhanced message leaving service. In accordance with one approach of the present invention, a message leaving service is provided to all users, without requiring either the calling parties or the called parties to subscribe to the service. The enhanced message leaving service is illustratively realized through the use of alternate network 210 and through the use of an approach for minimizing the load on the network associated with the process of leaving a message.

More specifically, the message left for users is first stored close to the location of the calling party, employing as little of network resources as practicable. Next, the message is forwarded from the node where it is first stored to a platform which is accessed by the called party and which presumably is relatively close to the called party. The interesting aspect of this step is that the message is forwarded in non-real time, when capacity is available on the telecommunications network. In the embodiment shown in FIG. 2, the message is forwarded over alternate network 210. In the arrangement currently existing in the United States, where the LEC networks and the IXP networks are owned by different commercial entities, the embodiment presented in FIG. 2 employs local servers in the IXP network as the nodes for storing messages.

Assuming once again that the communication between local user 122 and local user 134 has failed in the sense that user 134 has not answered (or local user 134's telephone is busy), in the FIG. 2 embodiment, a message is left by user 122 for local user 134 that is initially stored on local server 106 (while local server 106 is shown in FIG. 2 as being within the IXP, the local server may, alternatively, be a local server of either LEC (i.e., LEC 102 or LEC 112) if the LEC provides the messaging service instead of the IXP, in which case the local server would simply be part of LEC 102 or LEC 112, or the local server may a third party server that provides message services either through a LEC or an IXP). Local server 106, in accordance with the principles disclosed herein, communicates with network 210 to establish a scheduled time at which the transfer of the message to local server 116 will occur (if the local servers are part of the LEC instead of the IXP, they would still be connected together through alternate network 210).

The scheduled time is based on the loading of the alternate network such that the resources used to send the message are, in essence, merely spare resources that are temporarily not being used. Because the message does not require bi-directional real-time communication, there can be some delay in the transfer of the message. Then, local server 106 sends the message to the remote local server (i.e., local server 116) at the scheduled time. Further, because the message is sent through alternate network 210 instead of real-time network 110, the system loading on real-time network 110 is reduced.

Other advantages of the present invention may be achieved by providing a direct link 222 between LEC 102 and local server 106 (and a similar direct link 224 between LEC 112 and server 116). The direct links provide an avenue for the server to place direct local communications—through the local LEC—to the recipient so that messages may be transferred without incurring additional long distance FCC mandated access charges. Under such circumstances, the remote local server appears the same as a local user to the LEC (e.g., as applied to the example shown in FIG. 2, LEC 102 would have six local users including local server 106 and local users 120, 122, 124, 126 and 128).

Figure 3:
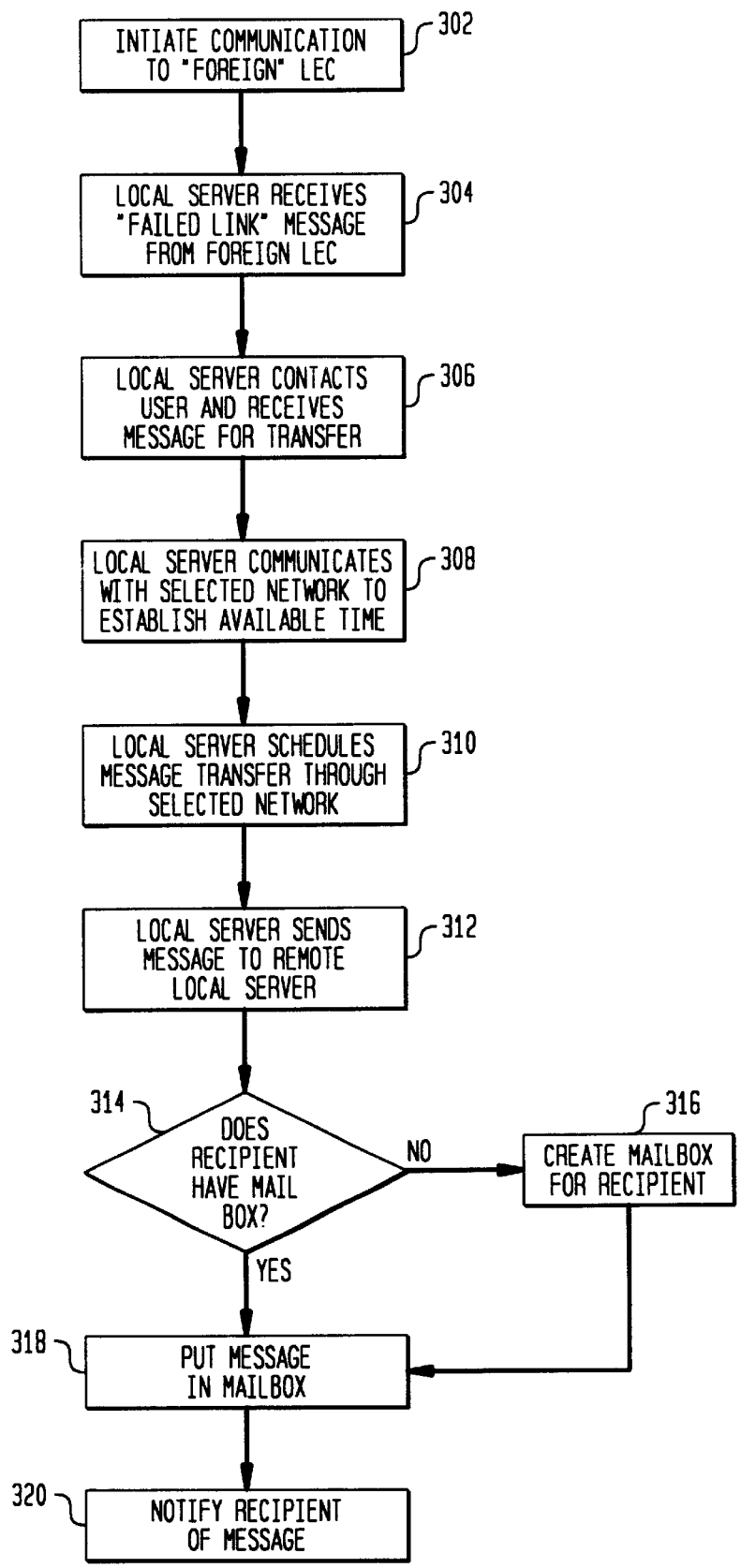
FIG. 3 is a flow diagram showing the operation of the multi-path communication system shown in FIG. 2.
Figure 4:
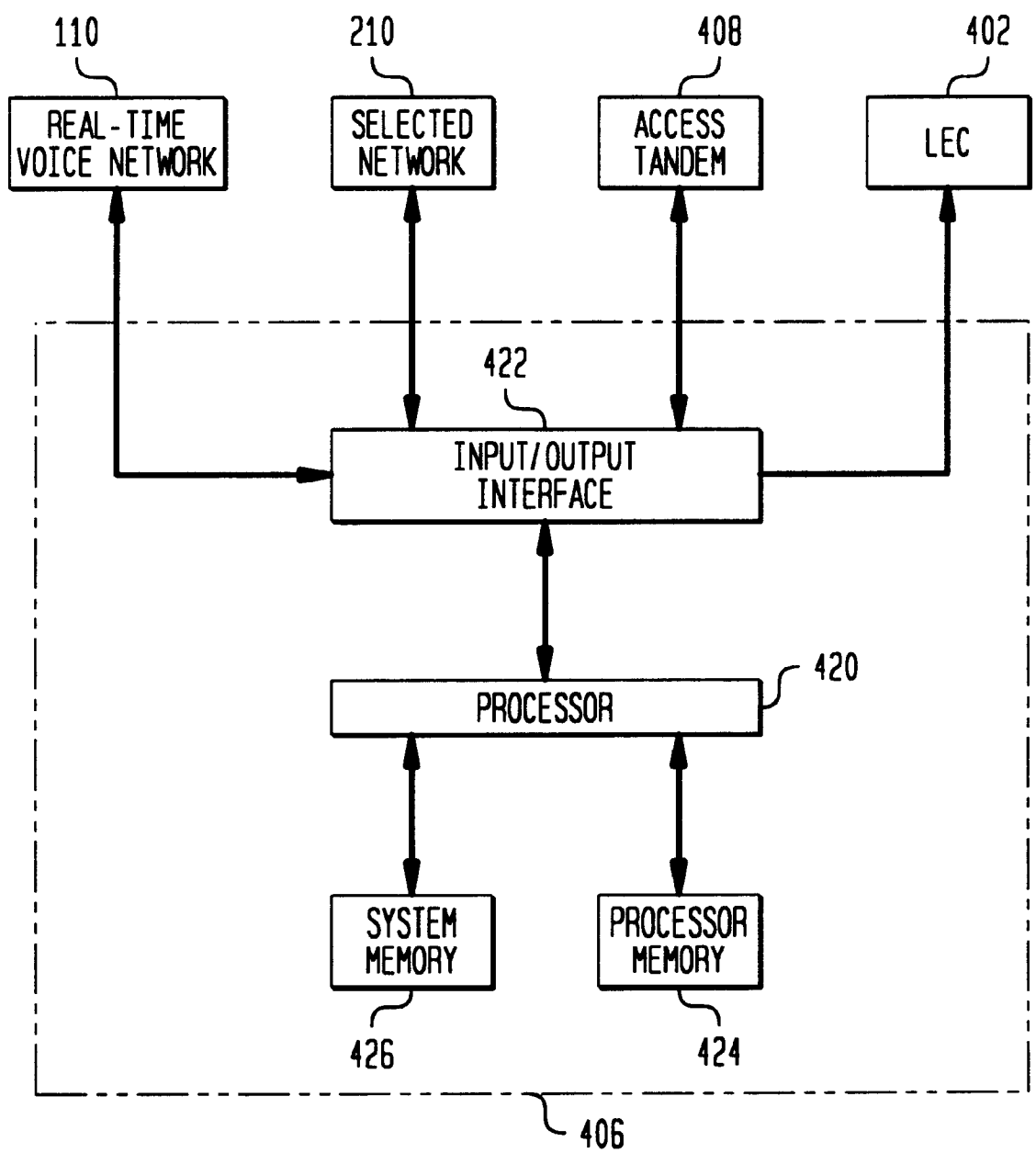
FIG. 4 is a block diagram of a representative local server of the communication system shown in FIG. 2.

The specific steps involved in providing an alternate communication path in the event of a failed communication attempt (i.e., the called party does not answer) are shown in detail in the flow diagram shown in FIG. 3. One hardware configuration for the local servers that effectuates the steps shown in FIG. 3 is shown in FIG. 4. The first step 302 is initiated by a local user (e.g., local user 122) who attempts to communicate with a user located in a region served by a "foreign" LEC (i.e., not the LEC that services local user 122). In a step 304, processor 420 (see FIG. 4) in the sending local server receives a "Failed Communication Attempt" message from the foreign LEC. The local server, in a step 306, contacts the sending local user and receives a message for the recipient (assuming the local user wishes to send a message).

The processor in the local server communicates, in a step 308, with the alternate network to establish available time slots (i.e., when the network has spare capacity) for transfer of the message across the network. The processor in the local server then selects an available time slot based on loading and, in a step 310, schedules the message for transfer. At the scheduled time, which may be immediate or which may not be until network loading is reduced below a predetermined level, the local server processor, in a step 312, sends the message through the alternate network to the remote local server, where received. The received message may be immediately placed in a mailbox dedicated to the called party (see step 318 below) or it may be stored in a queue for further processing by the remote local server (depending on the loading of the remote local server).

The remote local server, in a step 314, determines whether the recipient has a "mailbox" on the remote local server. If no mailbox exists, the remote local server, in a step 316, creates a mailbox—even if the recipient is not a subscriber to the inter-exchange provider. Once it has been established that a mailbox exits, the processor in the remote local server, in a step 318, transfers the message to the mailbox (either directly or from the queue, as described above). The process is complete when, in step 320, the remote local server initiates a procedure to notify the recipient that a message is waiting. The procedure for notifying the recipient may include: (1) directly communicating with the recipient from the remote server (i.e., the remote server repeatedly attempts to place a call to the recipient through the remote LEC); (2) contacting the recipient through a pager or cellular phone; or (3) directing the remote LEC to send a "message waiting" signal to the recipient (e.g., such that a message light, stutter dial tone or other means notifies the recipient that a message is waiting).

If the paging notification is used, the message may be sent to the local server where, instead of being stored in a mailbox, a page is sent to the recipient containing the message (or, if the mailbox is utilized, the page would simply notify the recipient that a message has arrived). If a cellular phone is used to contact the recipient, similar alternatives are available (i.e., sending the message to the recipient or merely sending a call to the recipient as notification that a message is waiting). Under the paging and cellular phone scenarios, they would most likely only be utilized if the recipient subscribed to a message receiving service and has selected paging or cellular phone service for notification (to prevent the sender from incurring unexpectedly high messaging costs).

FIG. 4 shows a simplified schematic diagram of representative circuitry of a local server (e.g., local server 406) that is part of communication system 200. As shown in FIG. 4, local server 406 includes four basic components: processor 420, input/output interface 422, processor memory 424, and system memory 426. Processor 420 may be as simple as preprogrammed controller, or it may be as complex as a multi-processor array that performs multi-task processing. Processor memory 424 preferably includes cache memory and may also include processor registers (which may, instead, be included within processor 420). Additionally, processor 420 and processor memory 424 may be combined within a single integrated circuit or combined onto a single circuit board without departing from the spirit of the present invention.

Input/output interface 422 performs various functions to interface processor 420 with the "outside world." The outside world includes analog network 110 and alternate network 210, as well as LEC 402 and access tandem 408 for long-distance communications, as described above. System memory 426 may include random access memory (RAM), hard drives, magneto-optical drives, tape drives, or any other conventional apparatus used to store information in a computer system.

As set forth in the flow chart of FIG. 3, a message is received at the sending local server through input/output interface 422 (from LEC 402 or through tandem access 408) and is stored in processor memory 424. The message may be processed through processor 420 or instead, it may be directly loaded from input/output interface 422 to processor memory 424 based on the instructions from processor 420. Once the scheduled time for message transmission occurs, processor 420 sends the message from memory 424 through input/output interface 422 to alternate network 210, which passes the message to another instance of server 406 (i.e., remote server 406). It may be noted that the message need not be sent in a single burst, but could instead be sent "piece meal" in multiple individual packets as network capacity permits.

The message passes into remote server 406 through input/output interface 422 and into processor 420 (or processor 420 directs the message into processor memory 424). Processor 420 then examines the message to determine the recipient and checks to see if a mailbox exists in system memory 426 for the recipient. If no mailbox exists, processor 420 creates a mailbox in memory 426. Once a mailbox exists for the recipient, processor 420 acts to direct the message to the mailbox in system memory 426 and initiates the appropriate procedure to notify the recipient of the pending mail message.

Persons skilled in the art will appreciate that the present invention may be practiced by other than the described embodiments, which are presented for purposes of illustration and not of limitation, and the present invention is limited only by the claims which follow.

What is claimed is:

1. A method for providing an alternate communications path in the event of a communications failure, said method comprising the steps of:

attempting to complete a communications link from a sending user to a recipient through a first communications network;

detecting a failure in said attempted communications link;

determining whether said sending user desires to leave a message for said recipient;

receiving said message from said sending user at a server local to said sending user if said sending user desires to leave said message;

storing said message at said local server;

sending said message through a selected communications network that normally is used to pass two-way conversation information from a calling party to a called party, in a delay-permissible non-real-time manner to a server that is local to said recipient when capacity on said selected network is available;

receiving said message at said server that is local to said recipient; and initiating a procedure for notifying said recipient that a message is waiting.

2. The method of claim 1, wherein said selected communications network is a data network.

3. The method of claim 1, wherein said selected communications network is exclusive of said first communications network.

4. The method of claim 1, wherein said selected communications network is a packet network.

5. The method of claim 1, wherein said selected communications network is coextensive with said first communications network.

6. The method of claim 1, wherein said selected communications network is a second network that is parallel to said first network and is essentially entirely separate from said first communications network.

7. The method of claim 6, wherein said second network is a digital network.

8. The method of claim 1, wherein said step of receiving comprises the steps of:
 determining if said recipient has a mailbox on said recipient local server;
 creating a mailbox for said recipient on said recipient local server if one does not exist; and
 depositing said message in said mailbox of said recipient.

9. The method of claim 5, wherein said step of receiving comprises the steps of:
 determining if said recipient has a mailbox on said recipient local server;
 creating a mailbox for said recipient on said recipient local server if one does not exist; and
 depositing said message in said mailbox of said recipient.

10. The method of claim 1, wherein said step of initiating comprises the steps of:
 initiating a local call to said recipient; and
 providing said message to said recipient if said local call is completed.

11. The method of claim 1, wherein said step of initiating comprises the step of:
 providing a signal to said recipient's local exchange provider that causes said recipient's local exchange provider to produce a "message waiting" signal to said recipient.

12. The method of claim 1, wherein said step of initiating comprises the steps of:
 initiating a cellular local to call said recipient, carried over a cellular network that is other than said first communications network; and
 providing said message to said recipient if said cellular call is completed.

13. The method of claim 1, wherein said step of initiating comprises the steps of:
 initiating a page to said recipient; and
 providing said message to said recipient's pager if said pager is capable of producing said message to said recipient, otherwise, providing a number to said recipient for said recipient to call to receive said message.

14. A method for providing an alternate communications path to allow a message to be sent from a sending party to a recipient in the event that a communication path cannot be established over a primary communications network, said method comprising the steps of
 acquiring an indication that said primary communications network is unavailable for communications;
 receiving a message from said sending party;
 sending said message over a selected parallel communications network that normally is used to pass two-way conversation information from a calling party to a called party, when it is determined that capacity is available in said parallel communications network;
 filing said message in a server that is local to said recipient; and
 notifying said recipient that a message is waiting.

15. The method of claim 14, wherein said parallel network is a digital network.

16. The method of claim 14, wherein said parallel network is essentially entirely separate from said primary network.

17. The method of claim 14 further comprising the step of:
 storing said message on a server that is local to said sending party, said step of storing occurring between said steps of receiving and sending.

18. The method of claim 17, wherein said step of sending occurs only when said selected network has spare capacity.

19. The method of claim 14, wherein a communication path cannot be established over a primary communications network because said recipient's telephone is busy.

20. The method of claim 14, wherein a communication path cannot be established over a primary communications network because said recipient does not answer the telephone.

21. The method of claim 14, wherein a communication path cannot be established over a primary communications network because said primary communications network is inoperative.

22. The method of claim 14, wherein a communication path cannot be established over a primary communications network because said primary communications network is in an overloaded condition.

23. The method of claim 14, further comprising the step of providing delay-permissible near-real time communication between said sending party and said recipient over said selected network when said communications path cannot be established over said primary network.

24. A method for delivering a message in the event of a failed attempt to establish a communication path between a calling party and a called party, the method comprising the steps of:
 attempting to complete a communications path between the calling party and the called party through a first communications network;
 detecting a failure in said step of attempting;
 queuing said calling party to leave said message;
 receiving said message from said calling party at a first server, said first server being local to said calling party;
 sending said message to a second server, said second server being local to said called party, over a selected communications path that normally is used to pass two-way conversation information from a calling party to a called party, when it is determined that capacity on said selected network is available;
 receiving said message at said second server;
 creating a mailbox for said called party in said second server if said called party does not have such a mailbox;
 depositing said message in said mailbox; and
 initiating a procedure for notifying said calling party that a message.

* * * * *

UNITED STATES PATENT AND TRADEMARK OFFICE
CERTIFICATE OF CORRECTION

PATENT NO.    : 6,493,321 B1
DATED         : December 10, 2002
INVENTOR(S)   : B Waring Partridge It is certified that error appears in the above-identified patent and that said Letters Patent is hereby corrected as shown below:

<u>Column 8,</u>
Line 62, "message." should read -- message has been deposited. --

Signed and Sealed this

Third Day of June, 2003

JAMES E. ROGAN
*Director of the United States Patent and Trademark Office*